(12) United States Patent
Breitscheidel et al.

(10) Patent No.: US 7,135,524 B2
(45) Date of Patent: Nov. 14, 2006

(54) PLASTICIZERS FOR PLASTICS

(75) Inventors: Boris Breitscheidel, Limburgerhof (DE); Thomas Schäfer, Mannheim (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 278 days.

(21) Appl. No.: 10/487,083

(22) PCT Filed: Aug. 22, 2002

(86) PCT No.: PCT/EP02/09399

§ 371 (c)(1),
(2), (4) Date: Feb. 19, 2004

(87) PCT Pub. No.: WO03/018686

PCT Pub. Date: Mar. 6, 2003

(65) Prior Publication Data

US 2004/0198909 A1    Oct. 7, 2004

(30) Foreign Application Priority Data

Aug. 23, 2001   (DE)   ................ 101 41 250

(51) Int. Cl.
*C08L 27/06*   (2006.01)
*C08L 29/14*   (2006.01)
*C08L 81/04*   (2006.01)
*C08L 67/02*   (2006.01)

(52) U.S. Cl. ............... 525/58; 525/167; 525/437; 524/311

(58) Field of Classification Search ............ None
See application file for complete search history.

(56) References Cited

U.S. PATENT DOCUMENTS

| | | | |
|---|---|---|---|
| 2,838,428 A | | 6/1958 | Bohrer |
| 3,149,087 A | * | 9/1964 | Anagnostopoulos et al. ............ 524/296 |
| 3,331,802 A | | 7/1967 | Huber |
| 3,723,369 A | * | 3/1973 | Lutz, Jr. et al. ............ 524/306 |
| 3,972,962 A | * | 8/1976 | Williams et al. ............ 525/174 |
| 4,504,652 A | * | 3/1985 | Widder et al. ............ 528/480 |
| 5,281,647 A | | 1/1994 | Eapen |
| 6,111,004 A | * | 8/2000 | Biesiada et al. ............ 524/311 |

FOREIGN PATENT DOCUMENTS

| | | |
|---|---|---|
| DE | 1 645 554 | 7/1970 |
| DE | 101 28391 | 12/2002 |
| GB | 737929 | 5/1955 |
| GB | 1173323 | 12/1969 |
| RO | 104737 | 9/1994 |

OTHER PUBLICATIONS

Derwent Abst. 93-186745/23.

* cited by examiner

*Primary Examiner*—David J. Buttner
(74) *Attorney, Agent, or Firm*—Novak Druce & Quigg, LLP

(57) ABSTRACT

The present invention relates to a mixture encompassing at least one plastic A, in particular polyvinyl chloride (PVC), polyvinyl butyral (PVB), or a polysulfide, and at least one polyester B which can be prepared from a dicarboxylic acid I, and from at least one diol II selected from the group consisting of 1,2-propanediol, 1,3-butanediol, and 1,4-butanediol, and from a monocarboxylic acid III, in particular acetic acid, and also to the use of the mixtures of the invention in casings for electrical devices, in kitchen machines, in computer cases, in piping, chemical apparatus, cables, wire sheathing, window profiles, in interior fittings, in vehicle construction and furniture construction, in floorcoverings, for producing medical items, packaging for food or drink, gaskets, sealing compounds, including those for sealed glazing, films, including roofing films, composite films, phonographic disks, synthetic leather, toys, packaging containers, adhesive tape films, clothing, or coatings, or as fibers for fabrics, or as films for laminated safety glass.

7 Claims, No Drawings

PLASTICIZERS FOR PLASTICS

The present invention relates to a mixture encompassing at least one plastic A, in particular polyvinyl chloride (PVC), polyvinyl butyral (PVB), or a polysulfide, and encompassing at least one polyester B which can be prepared from a dicarboxylic acid I, and from at least one diol II selected from the group consisting of 1,2-propanediol, 1,3-butanediol, and 1,4-butanediol, and from a monocarboxylic acid III.

DE 10128391.1 discloses that dicarboxylic diesters made from a dicarboxylic acid and from an alkylene glycol monoether may be used as plasticizer for polyvinyl butyral or a polysulfide. Cyclohexanepolycarboxylic acids or derivatives of these are also used as plasticizers for polyvinyl chloride or polyvinyl acetals, in particular polyvinyl butyral, as described in DE 10116812.8, for example.

Besides monomeric cyclohexanepolycarboxylic esters, phthalic esters, and adipic esters, there are also various polyesters used as plasticizers for plastics. Polyester plasticizers are usually prepared by esterifying polyhydric alcohols with a polycarboxylic acid. In the case of syntheses with an excess of alcohol, terminal alcohol groups may optionally be capped with monocarboxylic acids, while in the case of syntheses with an excess of acid, terminal acid groups may optionally be capped using monohydric alcohols.

Polyester plasticizers are used especially when producing films, coatings, profiles, floorcoverings, or cables from plasticized PVC if there are relatively high requirements placed upon resistance to extraction, especially to gasoline, oils, and fats, and upon UV resistance, and the volatility of the plasticizer.

GB 1 173 323 describes polyester plasticizers based on adipic acid and 1,3-butanediol, and having terminal acid groups capped using 2-ethylhexanol, isodecanol, or isohexanol. The polyesters are intended to be suitable as plasticizers for PVC and in particular to have high resistance to extraction by hexane, kerosene, alkaline solutions, and soapy water.

U.S. Pat. No. 5,281,647 describes polyester plasticizers prepared by esterifying adipic acid, trimethylpentanediol, and propylene glycol, and having terminal acid groups capped using 2-ethylhexanol. The polyesters are intended to be suitable as plasticizers for PVC and rubber and to have high resistance to extraction by oils or soapy water.

RO 104 737 describes polyester plasticizers based on adipic acid and propylene glycol and having terminal acid groups capped using 2-ethylhexanol. The polyesters are intended to be suitable as plasticizers for PVC and in particular to have good storage stability.

The disadvantages of the plasticizers described in GB 1 173 323, U.S. Pat. No. 5,281,647 and RO 104 737 are first that they do not have sufficiently high compatibility with plastics, in particular with PVC, PVB, and polysulfide, i.e. they exude to a considerable extent during use and therefore result in partial loss of the flexibility of the plastic items produced using the polyester plasticizers. Secondly, their low-temperature flexibility properties are inadequate, and there are therefore limitations on the outdoor use of the plastic items produced using these plasticizers.

It is an object of the present invention, therefore, primarily to provide mixtures encompassing a plastic, in particular polyvinyl chloride (PVC), polyvinyl butyral (PVB), or a polysulfide, and substances whose physical and chemical properties make them suitable for use as plasticizers in plastics and which have good compatibility and which give good low-temperature flexibility in plastic items produced using these plasticizers.

We have found that this object is achieved by means of mixtures encompassing at least one plastic A and at least one polyester B, the polyester B being preparable from a dicarboxylic acid I, and from at least one diol II selected from the group consisting of 1,2-propanediol, 1,3-butanediol, and 1,4-butanediol, and from a monocarboxylic acid III.

For the purposes of the present invention, a polyester B which can be prepared from a dicarboxylic acid I, and from at least one diol II selected from the group consisting of 1,2-propanediol, 1,3-butanediol, and 1,4-butanediol, and from a monocarboxylic acid III implies that a dicarboxylic acid I is esterified with at least one diol II selected from the group consisting of 1,2-propanediol, 1,3-butanediol, and 1,4-butanediol, and that those hydroxyl groups of the diol not linked to the dicarboxylic acid have been esterified using a monocarboxylic acid.

According to the invention, the polyester B may be prepared using just one diol II selected from the group consisting of 1,2-propanediol, 1,3-butanediol, and 1,4-butanediol, or using a mixture made from two or more of these, or using a mixture made from a diol II selected from the group consisting of 1,2-propanediol, 1,3-butanediol, and 1,4-butanediol with one or more other diols.

According to the invention, dicarboxylic acids I which are particularly suitable for building the polyester B are aliphatic dicarboxylic acids, preferably aliphatic dicarboxylic acids having from 4 to 9 carbon atoms, such as adipic acid.

In one preferred embodiment, the present invention therefore provides mixtures encompassing at least one plastic A and at least one polyester B, the dicarboxylic acid I being an aliphatic dicarboxylic acid having from 4 to 9 carbon atoms, preferably adipic acid.

Examples of other diols suitable for building the polyester B of the invention, besides the at least one diol II selected from the group consisting of 1,2-propanediol, 1,3-butanediol, and 1,4-butanediol are 1,2-ethanediol, 1,3-propanediol, 1,2-butanediol, 1,2-pentanediol, 1,3-pentanediol, 2-methyl-1,3-pentanediol, 1,4-pentanediol, 1,5-pentanediol, neopentyl glycol, 1,2-hexanediol, 1,3-hexanediol, 1,4-hexanediol, 1,5-hexanediol, 1,6-hexanediol, diethylene glycol, triethylene glycol, the mononeopentyl glycol ester of hydroxypivalic acid, and mixtures of these diols.

According to the invention, examples of particularly suitable monocarboxylic acids III are acetic acid, propionic acid, 2-ethylhexanoic acid, n-heptanoic acid, and benzoic acid. For the purposes of the present invention, acetic acid is particularly preferred as monocarboxylic acid III.

The polyester plasticizers of the invention are prepared in a manner which is known per se in industry, by esterifying the dicarboxylic acid I with at least one diol II selected from the group consisting of 1,2-propanediol, 1,3-butanediol, and 1,4-butanediol, and, where appropriate, with other diols, in the presence of a monocarboxylic acid III for capping groups. The addition of monocarboxylic acid III controls the chain length and, respectively, the average molecular weight of the polyester plasticizers.

In one preferred embodiment, for example, adipic acid and at least one diol selected from the group consisting of 1,2-propanediol, 1,3-butanediol, and 1,4-butanediol form an initial charge in a reaction vessel together with, where appropriate, other diols, and acetic acid, and also esterification catalysts, such as dialkyl titanates, methanesulfonic acid, or sulfuric acid, preferably isopropyl butyl titanate, are first heated to 100–140° C. and homogenized by stirring.

The reaction mixture is then heated at atmospheric pressure to 160–190° C. Esterification with elimination of water starts at about 150° C. The water formed in the reaction is removed by distillation via a column. The reaction mixture is then further heated to 200–250° C., a vacuum of 150–300 mbar is applied, and further water produced in the reaction is removed from the reaction mixture by passage of nitrogen therethrough. The reaction mixture is stirred under vacuum with passage of nitrogen at 200–250° C. until the acid value of the reaction mixture has reached a value of <15 mg KOH/g.

To esterify the free hydroxyl groups, the reaction mixture is then preferably pumped into a second vessel and stirred at 200–250° C. under a vacuum of from 10 to 150 mbar, with removal of residual water by passing nitrogen at an increased rate, until the acid value of the reaction mixture has reached a value of <1.0 mg KOH/g. The product from the reaction is then preferably filtered while still at 100–140° C.

The polyesters B of the invention are composed of from 35 to 50 mol % of dicarboxylic acid I, in particular adipic acid, preferably from 40 to 48 mol %, particularly preferably from 42 to 46 mol %, from 5 to 50 mol % of at least one diol II selected from the group consisting of 1,2-propanediol, 1,3-butanediol, and 1,4-butanediol, preferably from 10 to 49 mol %, particularly preferably from 20 to 48 mol %, and, where appropriate, from 2 to 35 mol % of one or more other diols, preferably from 15 to 30 mol %, particularly preferably from 20 to 28 mol %, and also from 2 to 20 mol % of monocarboxylic acid III, in particular acetic acid, preferably from 5 to 15 mol %, particularly preferably from 6 to 10 mol %, where the total of the mol % values always has to be 100 mol %.

The polyesters B of the invention have a density of from 1.00 to 1.30 g/cm$^3$, preferably from 1.10 to 1.20 g/cm$^3$, particularly preferably from 1.12 to 1.16 g/cm$^3$, a viscosity of from 500 to 20 000 mPa*s, preferably from 1 500 to 15 000 mPa*s, particularly preferably from 2 000 to 12 000 mPa*s, a refractive index $n_D^{20}$ of from 1.450 to 1.490, preferably from 1.455 to 1.480, particularly preferably from 1.460 to 1.475, and an average molecular weight (number-average) determined by GPC of from 500 to 15 000, preferably from 1 000 to 10 000, particularly preferably from 2 000 to 8 000.

For the purposes of the present invention, an example of the content of at least one polyester B in the mixtures is from 1 to 50% by weight, preferably from 5 to 40% by weight, in particular from 10 to 30% by weight, based in each case on the entirety of the components.

The polyesters of the invention are suitable as plasticizers for plastics. They have very good compatibility with plastics, in particular with PVC, PVB, and polysulfide, and they give plastic items produced using these plasticizers very good low-temperature flexibility.

For the purposes of the present invention, a plasticizer is a substance which reduces the hardness of a plastic, in particular of polyvinyl chloride, or of polyvinyl butyral, or of a polysulfide, in the mixture of the invention.

The compatibility of a plasticizer in a plastic is determined by aging the plasticized plastic at 70° C. and 100% relative humidity for a prolonged period and weighing to determine the weight loss as a consequence of exudation of the plasticizer after certain intervals.

Particular plastics which have proven to be particularly advantageous for the mixtures of the invention are polyvinyl butyral, polyvinyl chloride, and polysulfides. A preferred embodiment of the present invention therefore provides mixtures encompassing at least one plastic A and at least one polyester B, the plastic A having been selected from the group consisting of polyvinyl butyral, polyvinyl chloride, and polysulfide.

The present invention therefore also provides the use, as plasticizer for polyvinyl butyral, polyvinyl chloride, or polysulfide, of a polyester B which can be prepared from a dicarboxylic acid I, and from at least one diol II selected from the group consisting of 1,2-propanediol, 1,3-butanediol, and 1,4-butanediol, and from a monocarboxylic acid III.

The plastics A preferably present in the mixture of the invention will be described in more detail below.

Polyvinyl acetals are obtained from polyvinyl alcohol by reaction with aldehydes. Besides cyclic acetal groups, the polyvinyl acetals may also have hydroxyl and acetate groups. One way of preparing polyvinyl butyral is reaction of a solution of polyvinyl alcohol in water with butyraldehyde and acid. In this process the PVB obtained precipitates from the solution.

Polyvinyl butyral is in particular prepared in a three-stage process via polyvinyl alcohol, starting from acetylene and acetic acid to prepare vinyl acetate monomer. Since vinyl alcohol is not a stable free compound and is not available for polymerization, the polyvinyl acetate is hydrolyzed in the presence of methanol to give polyvinyl alcohol. Polyvinyl butyral is obtained by acetalizing the polyvinyl alcohol with butyraldehyde in an acidic medium. Examples of ways of obtaining variants of the PVB resin are by way of the selection of the molecular weight of the starting polyvinyl acetate, the degree of hydrolysis to give polyvinyl alcohol, and the amount of butyraldehyde used for acetalization. PVB may therefore also be regarded as a terpolymer of vinyl acetate, vinyl alcohol, and vinyl butyral.

The properties of PVB are primarily determined by the proportion of free hydroxyl groups, and this is determined by the degree of hydrolysis of polyvinyl acetate to polyvinyl alcohol and by the amount of butyraldehyde used during acetalization. The proportion of free hydroxyl groups is generally from 5 to 50%, preferably from 10 to 40%, and particularly preferably from 15 to 25%.

Depending on the nature and the distribution of the cyclic acetal groups, hydroxyl groups, and acetate groups, the softening point of the PVB is from 80 to 150° C., in particular from 90 to 140° C.

Polyvinyl butyral is particularly used for producing films. The thickness of PVB films is typically from 0.1 to 2 mm, in particular from 0.4 to 1.5 mm.

A polysulfide is for the purposes of the present invention a polymer with thioether groups. Polysulfides can be linear or branched or else crosslinked. As well as thioether groups, the polysulfides used according to the invention may contain further functional groups in the main or side chains. For the purposes of the present invention, the mixtures according to the invention may also comprise two or more different polysulfides.

The polysulfides present in the mixtures of the invention may contain other functional groups besides thioether groups, in particular ether groups, aromatic groups, or else urethane groups. The polysulfides used according to the invention are preferably polymeric alkyl thioethers, and for the purposes of the present invention these alkyl groups may be linear or branched.

Polysulfides are in particular prepared by polycondensing alkali metal polysulfides, such as sodium pentasulfide, with alkyl dihalides, e.g. 1,2-dichloroethane or bis(2-chloroethoxy)methane. Trihalides, e.g. 1,2,3-trichloropropane, may also be added for crosslinking.

The properties of the polysulfides are in particular dependent on the nature of the alkyl radical, the sulfur content, and the molar mass, and also on the crosslinking density of the polysulfide. The molar masses of the polysulfides present in the mixtures of the invention are preferably in the range from 1 000 to 8 000 g/mol. The density of crosslinking, for example via sulfur bridges through reaction of terminal mercapto groups, affects the hardness of the polysulfides. According to the invention, the crosslinking density is in the range from 0.01 to 10 mol %, preferably from 0.02 to 5 mol %, in particular from 0.05 to 2 mol %.

For the purposes of the present invention, the polysulfides present in the mixtures of the invention are resistant to temperatures in the range from −50 to 125° C., in particular from −35 to 100° C.

Examples of uses of polysulfides are the production of sealing compounds, in particular sealing compounds for sealed glazing.

Polyvinyl chloride is obtained by homopolymerizing vinyl chloride. Examples of ways of preparing the polyvinyl chloride (PVC) used according to the invention are suspension polymerization, microsuspension polymerization, emulsion polymerization, and bulk polymerization. An example of a description of the preparation of PVC by polymerizing vinyl chloride, and of the preparation and composition of plasticized PVC is found in "Becker/Braun, Kunststoff-Handbuch, Volume 2/1: Polyvinylchlorid", 2nd Edition, Carl Hanser Verlag, Munich.

Depending on the content of plasticizers, mixtures comprising a plasticizer and polyvinyl chloride are divided into rigid PVC (<0.1% of plasticizers) and plasticized PVC (>0.1% of plasticizers).

The K value which characterizes the molecular weight of the PVC and is determined to DIN 53726 is from 57 to 90 for the PVC used according to the invention, preferably from 61 to 85, in particular from 64 to 75.

For the purposes of the invention, the content of polyvinyl acetal, in particular PVB, or of PVC, or, respectively, of a polysulfide, in the mixtures is from 20 to 99% by weight, preferably from 45 to 95% by weight, particularly preferably from 50 to 90% by weight, and in particular from 55 to 85% by weight, based in each case on the entirety of the components.

Besides at least one plastic A and at least one polyester B, the mixtures of the invention may also comprise other suitable additives. Examples which may be mentioned are stabilizers, lubricants, fillers, pigments, flame retardants, light stabilizers, blowing agents, polymeric processing aids, impact modifiers, optical brighteners, antistats, and biostabilizers.

Some suitable additives are described in more detail below. However, the examples listed do not in any way restrict the mixtures of the invention but are intended merely for illustration. All content values are % by weight values, based on the entirety of the components.

Stabilizers in particular neutralize the hydrochloric acid evolved during and/or after the processing of PVC.

The stabilizers used may be any of the conventional PVC stabilizers in solid or liquid form, for example conventional Ca/Zn stabilizers, Ba/Zn stabilizers, Pb stabilizers, or Sn stabilizers, or else acid-binding phyllosilicates, such as hydrotalcite.

The mixtures of the invention may have a content of from 0.05 to 7%, preferably from 0.1 to 5%, particularly preferably from 0.2 to 4%, and in particular from 0.5 to 3%, of stabilizers, based in each case on the entirety of the components.

Lubricants are intended to act between the particles of the plastic and reduce frictional forces during mixing, plastification, and shaping.

Lubricants which may be present in the mixtures of the invention are any of the usual lubricants for plastics processing. Examples of those which may be used are hydrocarbons, such as oils, paraffins, and PE waxes, fatty alcohols having from 6 to 20 carbon atoms, ketones, carboxylic acids, such as fatty acids or montanic acid, oxidized PE wax, metal carboxylates, carboxamides, and also carboxylic esters, for example with the alcohols ethanol, fatty alcohols, glycerol, ethanediol, pentaerythritol, and long-chain carboxylic acids as acid component.

The mixtures of the invention may have a content of from 0.01 to 10% by weight, preferably from 0.05 to 5% by weight, particularly preferably from 0.1 to 3% by weight, and in particular from 0.2 to 2% by weight, of lubricant, based in each case on the entirety of the components.

Fillers affect mainly compressive strength, tensile strength, and flexural strength, and also the hardness and heat resistance of plasticized plastics, in particular PVC, PVB and plasticized polysulfide, this effect being favorable.

For the purposes of the invention, the mixtures may also comprise fillers, for example carbon black and other inorganic fillers, e.g. naturally occurring calcium carbonates, such as chalk, limestone, and marble, synthetic calcium carbonate, dolomite, silicates, silica, sand, diatomaceous earth, aluminum silicates, such as kaolin, mica, and feldspar. The fillers used are preferably calcium carbonates, chalk, dolomite, kaolin, silicates, talc, or carbon black.

The mixtures of the invention may have a content of from 0.01 to 80% by weight, preferably from 0.1 to 60% by weight, particularly preferably from 0.5 to 50% by weight, and in particular from 1 to 40% by weight, of fillers, based in each case on the entirety of the components.

The mixtures of the invention may also comprise pigments in order to adapt the resultant product to various applications.

For the purposes of the present invention, use may be made of either inorganic or organic pigments. Examples of inorganic pigments which may be used are cadmium pigments, such as CdS, cobalt pigments, such as $CoO/Al_2O_3$, and chromium pigments, such as $Cr_2O_3$. Examples of organic pigments which may be used are monoazo pigments, condensed azo pigments, azomethine pigments, anthraquinone pigments, quinacridones, phthalocyanine pigments, dioxazine pigments, and aniline pigments.

The mixtures of the invention may have a content of from 0.01 to 10% by weight, preferably from 0.05 to 5% by weight, particularly preferably from 0.1 to 3% by weight, and in particular from 0.5 to 2% by weight, of pigments, based in each case on the entirety of the components.

The mixtures of the invention may also comprise flame retardants, to reduce flammability and smoke generation during combustion.

Examples of flame retardants which may be used are antimony trioxide, phosphate esters, chloroparaffin, aluminum hydroxide, boron compounds, molybdenum trioxide, ferrocene, calcium carbonate, and magnesium carbonate.

The mixtures of the invention may have a content of from 0.01 to 10% by weight, preferably from 0.1 to 8% by weight, particularly preferably from 0.2 to 5% by weight, and in particular from 0.5 to 3% by weight, of flame retardants, based in each case on the entirety of the components.

The mixtures may also comprise light stabilizers in order to protect the items produced from the mixture of the invention from surface damage due to exposure to light.

Examples of compounds which may be used for the purposes of the present invention are hydroxybenzophenones and hydroxyphenylbenzotriazoles.

The mixtures of the invention may have a content of from 0.01 to 7% by weight, preferably from 0.1 to 5% by weight, particularly preferably from 0.2 to 4% by weight, and in particular from 0.5 to 3% by weight, of light stabilizers, based in each case on the entirety of the components.

For the purposes of the present invention, the mixtures of the invention may also comprise other plastics selected from the group consisting of homo- and copolymers based on ethylene, propylene, butadiene, vinyl chloride, vinyl acetate, glycidyl acrylate, glycidyl methacrylate, or on acrylates or methacrylates whose alcohol components are branched or unbranched C1–C10 alcohols, styrene, or acrylonitrile.

Examples which should be mentioned are polyacrylates having identical or different alcohol radicals selected from the group consisting of the C4–C8 alcohols, particularly of butanol, of hexanol, of octanol, and of 2-ethylhexanol, polymethyl methacrylate, polyvinyl chloride, methyl methacrylate-butyl acrylate copolymers, methyl methacrylate-butyl methacrylate copolymers, ethylene-vinyl acetate copolymers, chlorinated polyethylene, nitrile rubber, acrylonitrile-butadiene-styrene copolymers, ethylene-propylene copolymers, ethylene-propylene-diene copolymers, styrene-acrylonitrile copolymers, acrylonitrile-butadiene rubber, styrene-butadiene elastomers, and methyl methacrylate-styrene-butadiene copolymers.

The mixtures of the invention encompassing polyvinyl butyral or polysulfides may in particular also comprise additives which are regulators for adhesion behavior with respect to glass, for example sodium salts, in particular sodium acetate and sodium lecithin. Other particular materials which may be present as additives in the mixtures of the invention encompassing at least one polysulfide, in order to improve adhesion to specific substrates, are phenolic resins, epoxy- or mercapto-functionalized silanes, and epoxy resins.

The mixtures of the invention encompassing polysulfides may also, for example, comprise hardeners, such as lead dioxide, calcium peroxide, zinc peroxide, or manganese dioxide.

Due to the high compatibility of the components, i.e. of the plastic A and the polyester B, the mixtures of the invention are particularly suitable for producing plasticized plastic items.

The invention therefore also provides the use of a mixture encompassing at least one plastic A, in particular polyvinyl chloride (PVC), polyvinyl butyral (PVB), or a polysulfide, and at least one polyester B which can be prepared from a dicarboxylic acid I, and from at least one diol II selected from the group consisting of 1,2-propanediol, 1,3-butanediol, and 1,4-butanediol, and from a monocarboxylic acid III, in casings for electrical devices, such as kitchen machines or computer cases, piping, chemical apparatus, cables, wire sheathing, window profiles, in interior fittings, in vehicle construction and furniture construction, in floorcoverings, for producing medical items, packaging for food or drink, gaskets, sealing compounds, including those for sealed glazing, films, including roofing films, composite films, films for laminated safety glass, in particular for the vehicle sector and the architectural sector, phonographic disks, synthetic leather, toys, packaging containers, adhesive tape films, clothing, or coatings, or as fibers for fabrics.

The invention also provides articles which comprise a mixture encompassing at least one plastic A, in particular polyvinyl chloride (PVC), polyvinyl butyral (PVB), or a polysulfide, and at least one polyester B which can be prepared from a dicarboxylic acid I, and from at least one diol II selected from the group consisting of 1,2-propanediol, 1,3-butanediol, and 1,4-butanediol, and from a monocarboxylic acid III. An example of an article of the invention is a casing for electrical devices, piping, apparatus, a cable, wire sheathing, a window profile, a floorcovering, a medical item, a toy, packaging for food or drink, a gasket, a sealing compound, including one for sealed glazing, a film, including a roofing film, a composite film, a film for laminated safety glass, in particular for the vehicle sector or the architectural sector, a phonographic disk, a synthetic leather, a packaging container, an adhesive tape film, clothing, or a coating, or a fiber for fabrics.

PVB items, in particular PVB films, produced from the mixtures of the invention have high strength, very good extensibility, and excellent adhesion to glass surfaces. They therefore permit the production of highly flexible films with good transparency and light resistance, and very good glass adhesion, this being particularly important for use as films in producing laminated safety glass.

The strength and extensibility of PVB films is in particular determined via their Shore hardness A and D (determination to DIN 53505), their tensile stress at break (determination to DIN EN ISO 527 Parts 1 and 3), their tensile strain at break (determination to DIN EN ISO 527 Parts 1 and 3), and their stress at 100% strain (determination to DIN EN ISO 527 Parts 1 and 3).

Polysulfide sealing compounds produced using the mixtures of the invention, for example, have not only high elasticity and low gas permeability, but also in particular good weathering resistance, good chemicals resistance, in particular swelling resistance, and good aging resistance.

The low-temperature flexibility properties of plasticized plastics are preferably characterized with the aid of cold-crack temperature and torsional rigidity. The cold-crack temperature is the temperature at which a plasticized plastic begins to show visible damage when exposed to mechanical load at low temperature. Cold-crack temperature is determined to DIN 53372. Torsional rigidity is the temperature at which a defined source can twist a plasticized plastic through a particular angle. Torsional rigidity is determined to DIN 53447.

We claim:

1. A mixture encompassing at least one plastic A selected from the group consisting of polyvinyl butyral and polysulfide and at least one polyester B, the polyester B being preparable from 35 to 50 mol % of a dicarboxylic acid I, and from 5 to 50 mol % of at least one diol II selected from the group consisting of 1,2-propanediol, 1,3-butanediol, and 1,4-butanediol, and from 2 to 20 mol % of acetic acid as monocarboxylic acid III.

2. A mixture as claimed in claim 1, wherein the dicarboxylic acid I is an aliphatic dicarboxylic acid having from 4 to 9 carbon atoms.

3. A mixture as claimed in claim 1, wherein the dicarboxylic acid I is adipic acid.

4. A mixture as claimed in claim 1, comprising other plastics selected from the group consisting of homo- and copolymers based on ethylene, propylene, butadiene, vinyl chloride, vinyl acetate, glycidyl acrylate, glycidyl methacrylate, or on acrylates or methacrylates whose alcohol components are branched or unbranched C1–C10 alcohols, styrene, or acrylontrile.

5. An article comprising a mixture as claimed in claim 1.

6. An article as claimed in claim 5, which is casing for electrical devices or is piping, apparatus, a cable, wire sheathing, a window profile a floor covering, a medical item, a toy, packaging for food or drink, a gasket, a sealing compound, including one for sealed glazing, a film, including a roofing film, a composite film, a film for laminated safety glass, a phonographic disk, a synthetic leather, a packaging container, an adhesive tape film, clothing, or a coating, or a fiber for fabrics.

7. A method for preparing plasticized polyvinyl butyral or polysulfide comprising the step of adding as plasticizer a polyester B which can be prepared from 35 to 50 mol % of a dicarboxylic acid I, and from 5 to 50 mol % of at least one diol II selected from the group consisting of 1,2-propanediol, 1,3-butanediol, and 1,4-butanediol, and from 2 to 20 mol % of acetic acid as monocarboxylic acid III to polyvinyl butyral or polysulfide.

* * * * *